(12) United States Patent
Smirnov

(10) Patent No.: US 9,916,637 B1
(45) Date of Patent: Mar. 13, 2018

(54) SPLITTING AND MERGING SUBBAND IMAGE DATA

(71) Applicant: Apple Inc., Cupertino, CA (US)

(72) Inventor: Maxim W. Smirnov, Wilsonville, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/499,448

(22) Filed: Apr. 27, 2017

(51) Int. Cl.
    *G06T 11/60* (2006.01)
    *G06T 1/20* (2006.01)

(52) U.S. Cl.
    CPC ............ *G06T 1/20* (2013.01); *G06T 2200/28* (2013.01)

(58) Field of Classification Search
    CPC .................. G06T 11/60; G06T 3/4038; G06T 2207/20221
    See application file for complete search history.

(56) References Cited

U.S. PATENT DOCUMENTS

| | | | |
|---|---|---|---|
| 8,958,476 B2* | 2/2015 | Kim | H04N 19/139 375/240.12 |
| 9,148,560 B2 | 9/2015 | Aoki et al. | |
| 2006/0008181 A1* | 1/2006 | Takekoshi | G06F 17/30265 382/305 |
| 2012/0082243 A1 | 4/2012 | Baylon et al. | |
| 2012/0229460 A1 | 9/2012 | Fortin | |
| 2016/0065864 A1 | 3/2016 | Guissin | |
| 2017/0150164 A1* | 5/2017 | Yasugi | H04N 19/50 |

* cited by examiner

*Primary Examiner* — Phi Hoang
(74) *Attorney, Agent, or Firm* — Fenwick & West LLP

(57) ABSTRACT

Embodiments of the present disclosure generally relate to image signal processing logic, and in particular, to separating an undecimated image signal data to create two components with lower resolution and full-resolution, generating an interpolation guidance information based on the two components created by separation, forming a difference image data representing the difference between the chroma and luma values of each pixel and its neighboring pixels, and merging the processed image data from the processing pipelines with the unprocessed image data using the interpolation guidance information generated. The generation of the interpolation guidance information is based on determining distances between pixel values from a group comprising pixels from interpolation nodes, pixels diagonally located adjacent to the interpolation nodes, pixels horizontally adjacent to the interpolation nodes, and pixels vertically adjacent to the interpolation nodes.

20 Claims, 13 Drawing Sheets

SPLITTING AND MERGING SUBBAND IMAGE DATA

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on a central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

In the modern hardware components used for image processing pipelines, implementing the image processing algorithms consume excessive power and computation time when performed on image data with high resolution. Such image processing algorithms often include the noise and color processing stages of the image processing pipelines.

SUMMARY

Embodiment relate to a sub-band splitter including a decimator circuit, an interpolation information generator, and a processing pipeline. The decimator circuit generates decimated image data from undecimated image data. The undecimated image data has a first pixel resolution and the decimated image data has a second pixel resolution that is lower than the first pixel resolution. The interpolation information generator produces interpolation guide information for each pixel in the undecimated image data. The interpolation guide information describes a level of similarity between pixel values of each pixel in the undecimated image data and pixel values of one or more neighboring pixels of each pixel in the undecimated image data or the decimated image data. The interpolation information generator also generates difference image data representing difference between the undecimated image data and a version of image reconstructed from the decimated image data and the interpolation guidance information. The processing pipeline processes the decimated image data without processing the difference image data. The sub-band merger combines the processed decimated image data with a modified version of the difference image data based on the interpolation information and generates a processed image data of the first pixel resolution. The difference image data is modified with parameter values to account for local tone mapping of the processed decimated image data.

Figure 1:
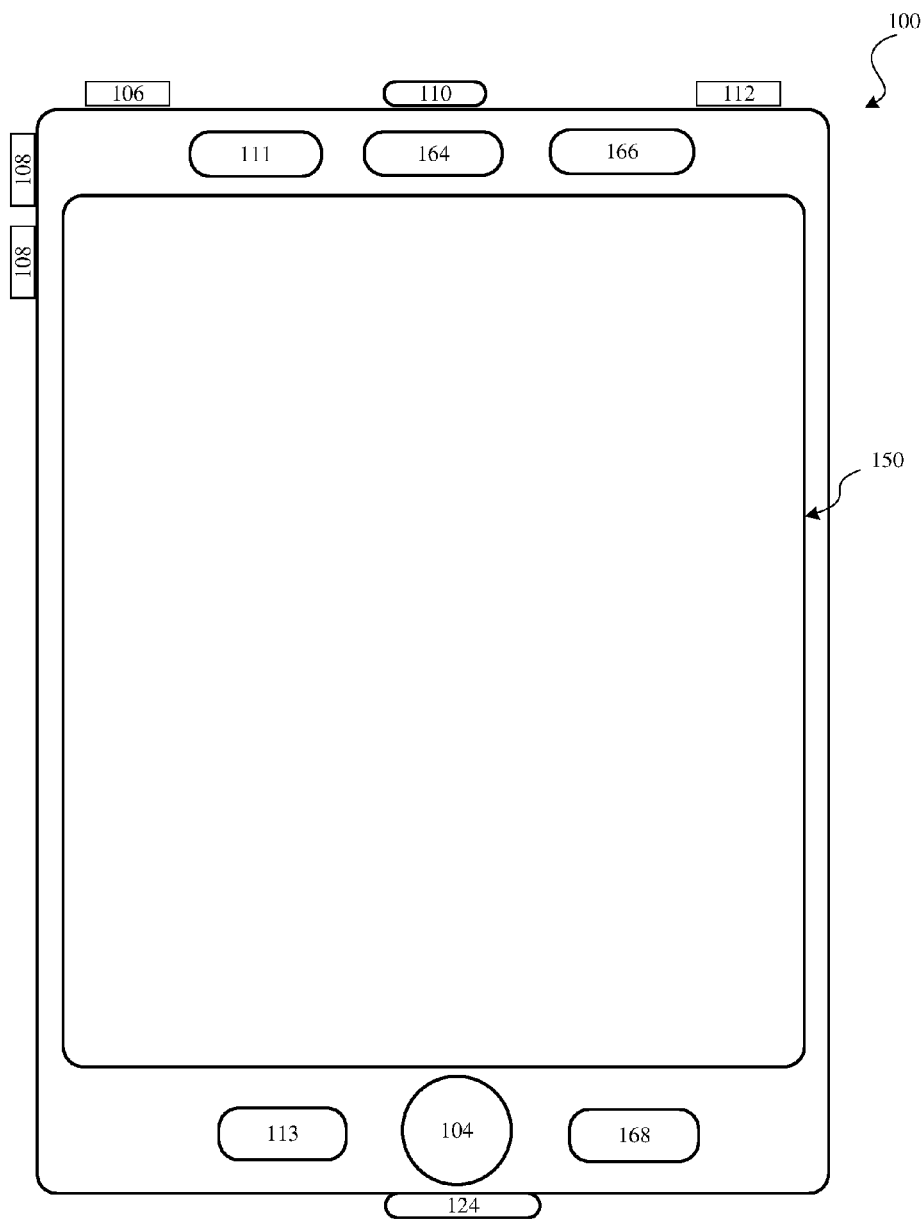
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure generally relate to digital image signal processing, and in particular, to separating an undecimated image signal data to create two components with lower resolution and full-resolution, generating an interpolation guidance information based on the two components created by separation, forming a difference image data representing the difference between the chroma and luma values of each pixel and its neighboring pixels, and merging the processed image data from the processing pipelines with the unprocessed image data using the interpolation guidance information generated. The generation of the interpolation guidance information is based on determining distances between pixel values from a group comprising pixels from interpolation nodes, pixels diagonally located adjacent to the interpolation nodes, pixels horizontally adjacent to the interpolation nodes, and pixels vertically adjacent to the interpolation nodes.

An "undecimated image data" described herein refers to an image signal data with full-resolution that consumes large amount of processing power and computational time in the processing pipelines. The operations performed on an undecimated image data determines the throughput of the processing pipelines, and the quality of picture received at the output.

A "decimated image data" described here refers to an image signal data with lower resolution generated from the undecimated image data by scaling the image signal data in at least one of the horizontal and vertical directions. The operations performed on a decimated image data consumes lower computational resources, and have less impact on the throughput through the processing pipelines. The decimated image data may, for example, be missing information from the upper band of the undecimated image spectrum that can deteriorate the image quality.

An "interpolation guidance information" described here refers to an information generated based on the undecimated and decimated image data indicating the type of relationship between each pixel in the undecimated image data and a neighboring pixel of each pixel. The interpolation guide information may represent a level of similarity between pixel values of each pixel and pixel values of its one or more neighboring pixels where the level of similarity is selected from different levels of similarity. Each level of similarity may describe a different degree of similarity between a pixel value of each pixel and pixel values of its one or more neighboring pixels.

A "difference image data" described here refers to the image signal data that represents the difference between the undecimated image data and its version reconstructed from the decimated image data based on an interpolation process, for example, using the interpolation guidance information.

The term "local tone mapping" described herein refers to the process of mapping the dynamic range of intensities captured by image sensor to the dynamic range of a display based on the location of a given pixel in the image signal data. For instance, a pixel of a given intensity may be mapped to a different value depending on whether it is located in a dark or bright area on the image signal data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
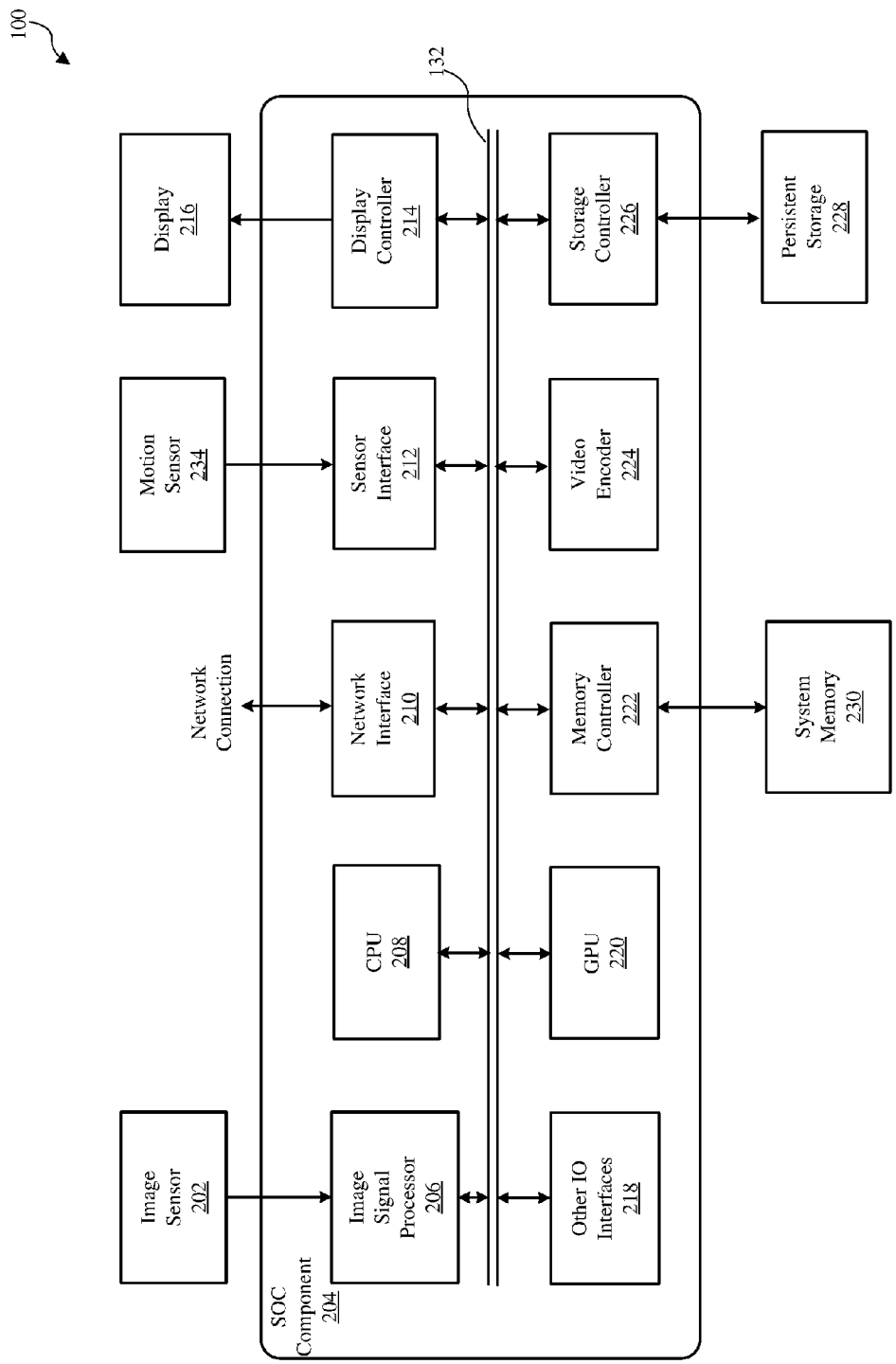
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, motion sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), NAND or NOR flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor 220 or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
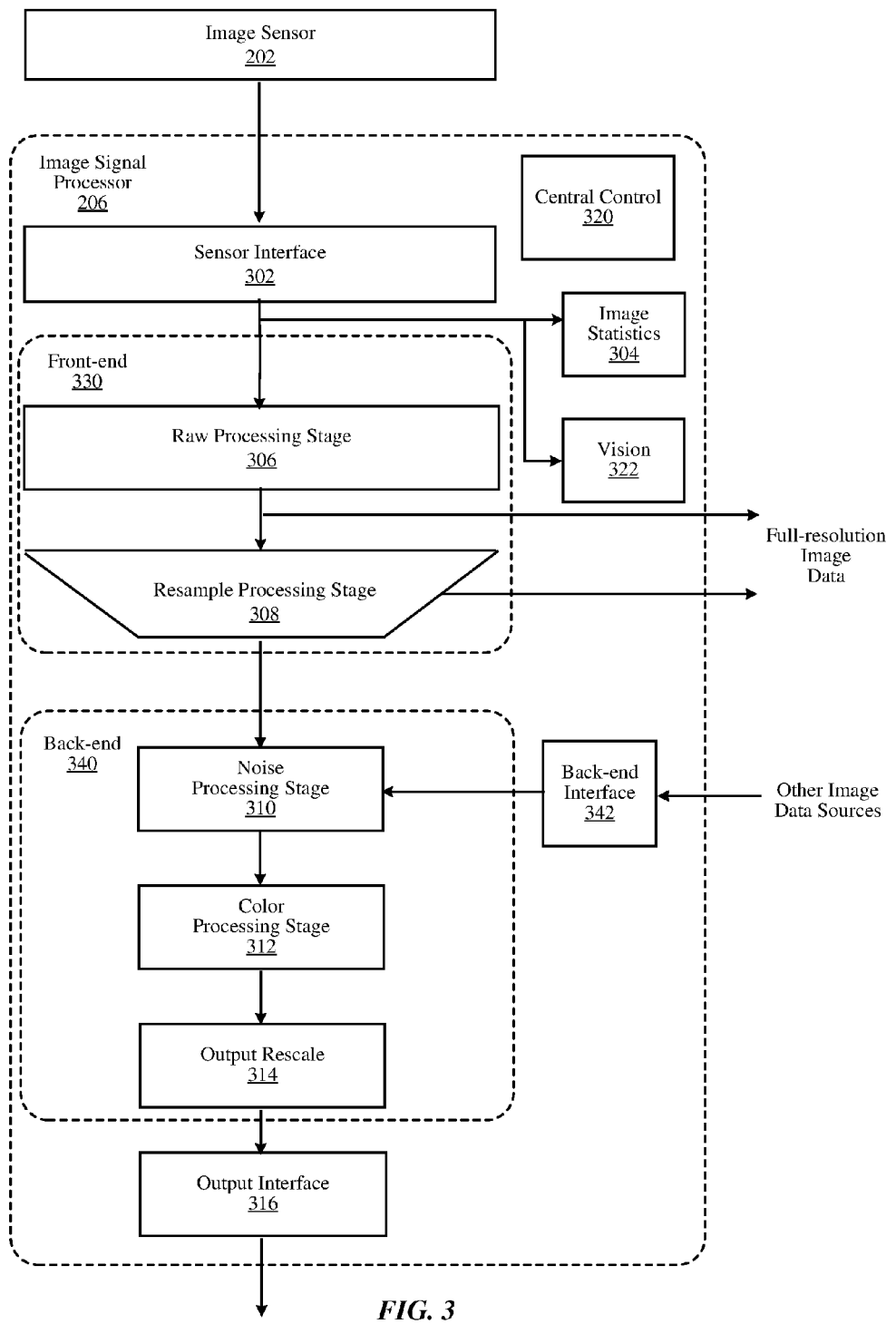
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle). Although embodiments described herein include embodiments in which the one or more back-end pipeline stages 340 process image data at a different rate than an initial data rate, in some embodiments back-end pipeline stages 340 may process image data at the initial data rate.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution may be used in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial noise filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionality of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Sequence of Image Processing for Sub-Band Splitting

Figure 4:
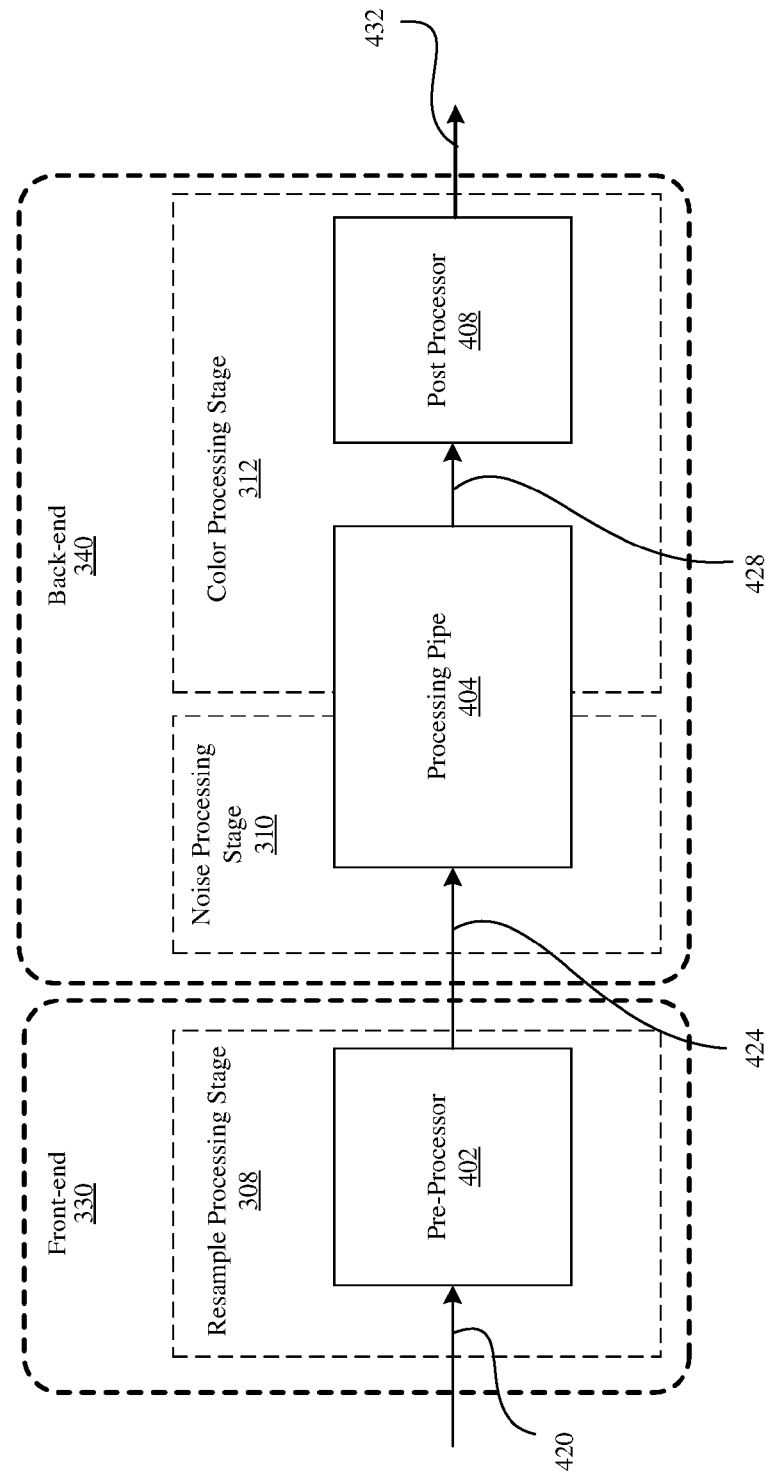
FIG. 4 is a block diagram illustrating stages of the image processing pipelines, according to one embodiment.

FIG. 4 is a block diagram illustrating stages of the image processing pipelines, according to one embodiment. In some embodiments of the ISP 206 of FIG. 3, the front-end 330 pipeline and back-end 340 pipeline stages may perform various operations including, but not restricted to, pre-processing, processing and post-processing of the image data 420 received from the raw processing stage 306.

The front-end stage 330 of the image processing pipelines may include a pre-processor 402. The pre-processor 402 may be part of a resample processing stage 308, described above with reference to FIG. 3. In an image processing pipeline performing operations on image signal data with full-resolution, separating a set of operations performed exclusively on the undecimated image data 420 with full-resolution at an early stage, and performing the rest of the operations involving image data with a lower resolution at later stages of the image processing pipelines, can result in, among several other advantages, a better throughput through the processing pipelines. Accordingly, the pre-processor 402 performs various operations, including but not restricted to, scaling and color conversion, that consume a large amount of computational resources when performed through the back-end 340 pipeline stages. The pre-processor 402 may include a toggle switch that can alternate between components performing operations on low resolution image signal data, and full-resolution image signal data in order to, among various other merits, improve the throughput of processing the image signal data.

The pre-processor 402 may include a compensation filter. The compensation filter performs digital pre-distortion to linearize the undecimated image data 420 for signal clarity. The pre-distortion provides a correction in the resample processing stage 308 to the undecimated image data 420 when the ISP 206 works in the non-linear region of operation.

The back-end pipeline 340 may include a processing pipe 404, and a post-processor 408. The frond-end pipeline 330 couples to the back-end pipeline 340 to receive the processed image data 424 generated by the front-end pipeline 330. The processing pipe 404 may include a set of pipelines performing various operations to reduce noise in the image data passing through the noise processing stage 310. The noise-reduction operations performed may include, but not limited to, color space conversion, gamma/de-gamma mapping, temporal filtering, noise filtering, luma sharpening, and chroma noise reduction. The processing pipe 404 of FIG. 4 may include pipelines in the color processing stage 312 that perform various operations associated with adjusting color information in the image data. The processing pipe 404 outputs the processed image data 428 to the post-processor 408. In another configuration, an intermediate line buffer memory unit, not shown in FIG. 4, may store the processed image data 428 from the processing pipe 404 before sending to the post-processor 408.

The post-processor 408 may perform various post-processing operations on the processed image data 428 including, but not restricted to, sharpening, as described below with reference to FIG. 12. The back-end pipeline 340 outputs the post-processed image data 432 generated at the post-processor 408.

In an alternative configuration of FIG. 4, the post-processor 408 may not be included as a separate component in the block diagram. The post-processor 408 may perform operations related to both the noise and color processing stages by residing as an extension of the processing pipe 404. The block diagram of FIG. 4 is only one embodiment of the present disclosure, and several other embodiments are possible in various combinations of hardware, firmware or software.

Example Sub-Band Splitting Operations

The purpose of the sub-band splitting is to reduce the amount of image signal data with full-resolution that passes through the noise processing stage 310 and the color processing stage 312, and thus, allowing, among several other merits, better ISP frame rate performance and reduced power consumption. In the pipelines used for processing image signal data with high resolution, it is desirable to reduce both the computational time as well as the power consumed while performing operations in the back-end stages, in particular, noise and color processing stages. However, if a single pipeline having no branches in between the input terminal and the output terminal of the pipeline performs the noise and color processing of the image signal data with full-resolution, the throughput of the pipeline is deteriorated for obvious reasons. In contrast, sub-band splitting is the concept of separating an image signal data with high resolution into two or more branches. One of the branches may include an image signal data with a low resolution that undergoes manipulation through the noise and color processing stages. Another branch may include an image signal data with full-resolution that bypasses the processing pipelines, and does not undergo operations that consume a large amount of power and computation time. In addition, the sub-band splitting results in better picture quality due to the separation of the input image data into two or more branches—one branch with lower resolution image signal data, and the other branch with higher resolution image signal data, and selectively performing power-consuming operations on the branch with lower resolution image signal data.

Figure 5:
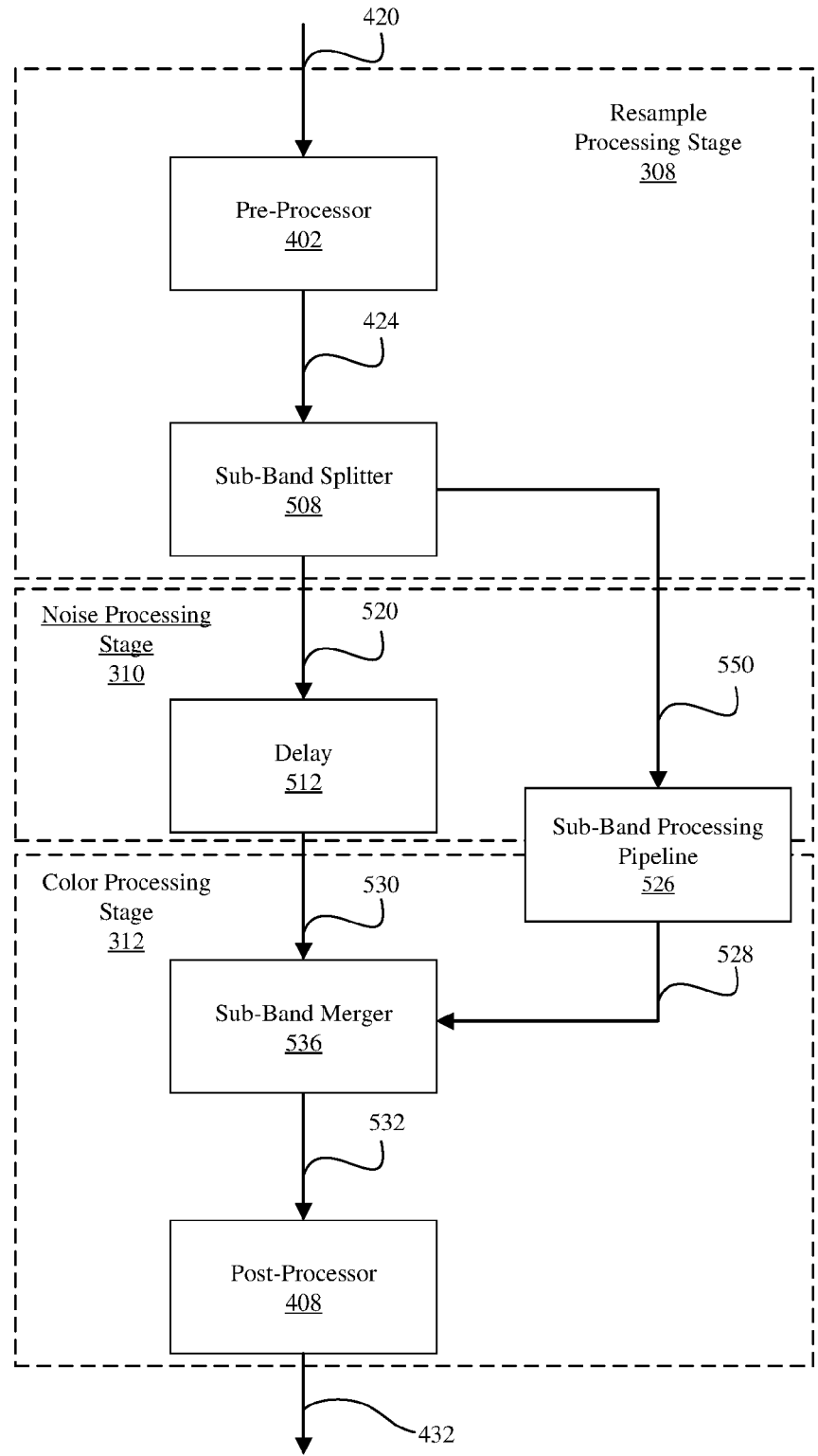
FIG. 5 is a detailed block diagram illustrating components of the stages involving sub-band splitting and merging, according to one embodiment.

FIG. 5 is a detailed block diagram illustrating the components associated with sub-band splitting and merging, according to one embodiment. The components associated with the sub-band splitting and merging include, among other components, a sub-band splitter 508, a delay module 512, a sub-band processing pipeline 526, and a sub-band merger 536 as well as the pre-processor 402 and the post-processor 408 of FIG. 4.

The sub-band splitter 508 is a circuit that separates the image data 424 from the output of pre-processor 402 into two layers of data: a decimated image signal data 550 with low resolution and an interpolation information 520 with full-resolution. The interpolation information 520 includes difference image data HPY, HPCbCr and the interpolation guidance information IG, described below in detail with reference to FIG. 6.

Further details of the separation process are described below with reference to FIG. 6. The sub-band splitter 508 outputs the decimated image signal data 550 to the sub-band processing pipeline 526, and to output the interpolation information 520 to the delay module 512. The delay module 512 matches latency of the interpolation information to the latency of the decimated image signal data introduces by the sub-band processing pipeline 526.

The decimated image signal data 550 is the image data with a low resolution generated by scaling in at least the horizontal and vertical directions relative to the image data 424. The decimated image signal data 550 passes through both the noise processing stage 310 and the color processing stage 312 when processed by the sub-band processing pipeline 526.

The delay module 512 is a circuit that buffers the interpolation information 520 so that the interpolation information 520 can undergo a required amount of delay in streaming of image data until the decimated image signal data 550 undergoing the color and noise processing at later stages of the processing pipelines reaches the input of the sub-band merger 536. The delay module 512 may include at least one line buffer memory with a variable size that matches the size of the interpolation information 520. The delay module 512 feeds the buffered interpolation information 530 to the input of the sub-band merger 536. In another embodiment, the delay module 512 may include a set of hardware components, in various combinations, arranged in order to match the streaming rate of the buffered interpolation information 530 with the streaming rate of the processed decimated image signal data 528.

In another embodiment, the delay module 512 is at the color processing stage 312. The delay module 512 of FIG. 5 is only an example, and therefore, may be obviated with various other combinations of hardware, firmware or software not explicitly shown here so as not to unnecessarily obscure aspects of the embodiments.

The sub-band processing pipeline 526 receives the decimated image signal data 550 from the sub-band splitter 508, and outputs a processed decimated image signal data 528. The sub-band processing pipeline 526 performs various operations in both the noise processing stage 310 and color processing stage 312 only on the decimated image signal data 550, thereby, consuming a relatively lower processing power and computational time, when compared to the processing pipe 404 of FIG. 4. The interpolation information 520 bypasses the sub-band processing pipeline 526 resulting in, among several other merits, a better throughput.

The sub-band merger 536 is a circuit that merges the processed decimated image signal data 528 from the sub-band processing pipeline 526 with the buffered interpolation information 530, further details of the merging process described with reference to FIG. 12. The sub-band merger 536 outputs the merged image data 532 to the post-processor 408. In alternate configurations, the merged image data 532 may temporarily reside in a circuit including one or more line buffers not shown in FIG. 5, before transferring to the post-processor 408.

FIG. 5 is only an example of the block diagram illustrated in the present disclosure, and may include various combinations of hardware, firmware, and software that may perform similar operations done by the components shown here. For example, at least one of the image data can reside in a set of line buffer memory units before transferring to any one of the components with reference to the block diagram of FIG. 5A.

Scaler and Noise Reducer

Figure 6:
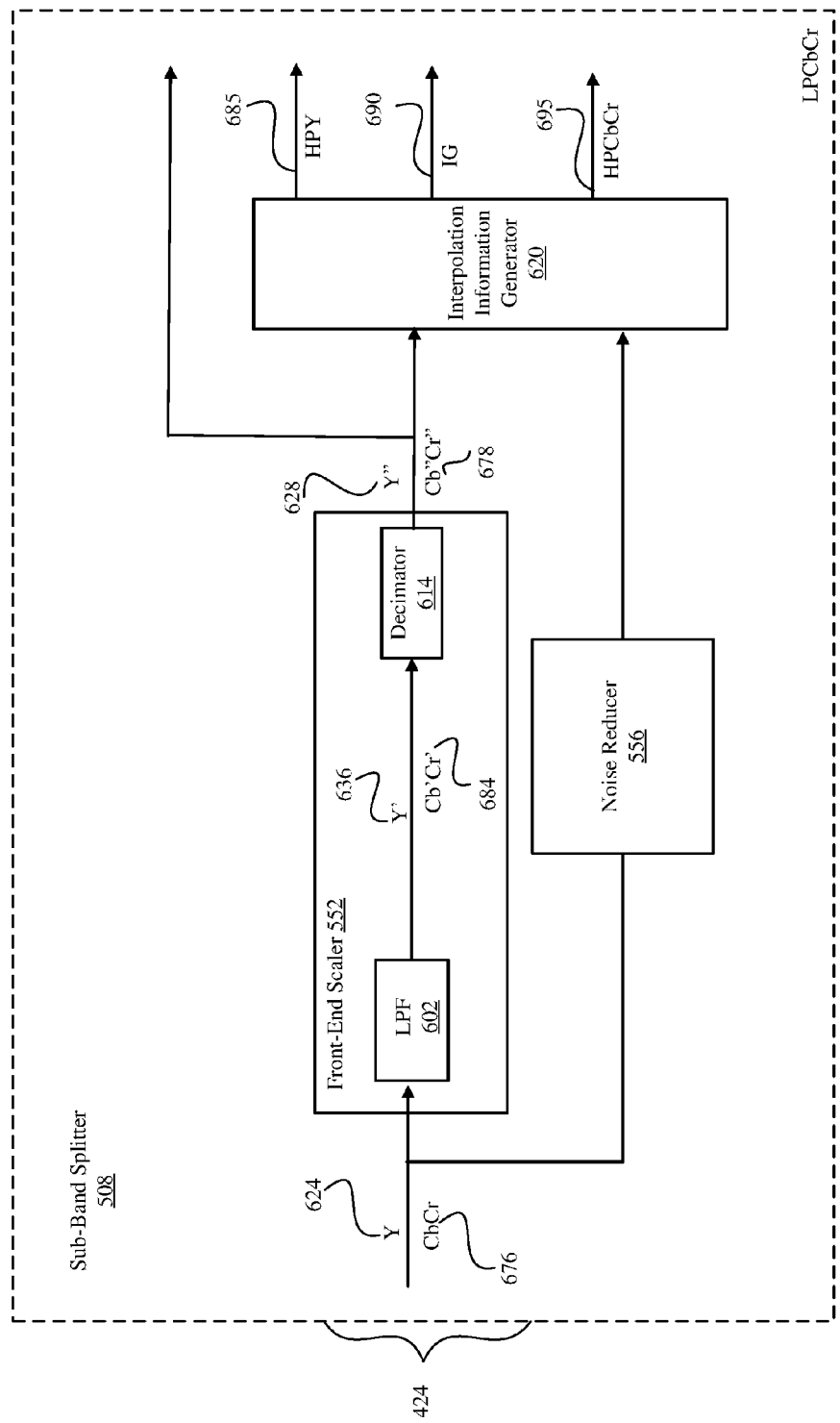
FIG. 6 is a block diagram illustrating the components of a sub-band splitter in FIG. 5, according to one embodiment.

FIG. 6 is a block diagram illustrating the components in the sub-band splitter 508, according to one embodiment. The components in the sub-band splitter 508 include a front-end scaler 552, a noise reducer 556, and an interpolation information generator 620. The input to the sub-band splitter 508 may include signals, including, but not restricted to, a luminance (Y) signal 624. In a full color mode, the input to the sub-band splitter 508 includes both the luminance (Y) signal 624 and a chroma (CbCr) signal 676. During the full color mode, the sub-band splitter 508 processes the luminance (Y) signal 624 and the chroma signal 676 whereas in a single color mode only the luminance (Y) signal 624 is processed.

In one embodiment, the front-end scaler 552 performs various operations in the front-end 330 stages, including, but not restricted to, downsampling, anti-aliasing and chroma suppression, to reduce the computation in the back-end 340 stages of the processing pipeline. The front-end scaler 552 may operate in different modes, including, but not restricted to, downscaling mode and sub-band splitting mode. In the downscaling mode, the front-end scaler 552 may perform both the vertical and horizontal scaling of the undecimated image data 420. The front-end scaler 552 may include a vertical scaler that downscales vertically by receiving up to two pixels per clock, and producing at most two pixels per clock. The front-end scaler 552 may include a horizontal scaler that downscales horizontally by receiving up to two pixels per clock, and producing at most one pixel per clock on its output.

The noise reducer 556 may perform noise filtering operations, including, but not restricted to, spatial noise filtering, chroma noise reduction, and so on. The noise reducer 556 may include parameters that can bypass the spatial noise filtering alone. The noise reducer 556 may contain a Look-Up-Table (LUT) with a noise standard deviation table with values describing the proper amount of noise filtering that is performed on both the dark and bright regions of the undecimated image data 424. In one embodiment, the noise reducer may also generate information to aid the Interpolation Information Generator 620.

Generally, the sub-band splitter 508 receives the image signal data 424 processed by the pre-processor 402 and outputs, among others, the interpolation guidance signal 690. As mentioned above, the sub-band splitter 508 may include a front-end scaler 552. In one embodiment, the front-end scaler 552 comprises a low-pass filter 602 and a decimator circuit 614. The output from the sub-band splitter 508 may include, among several other signals, a low-pass filtered and decimated luma signal (Y") 628, a full-resolution luminance difference image (HPY) signal 685, and a full resolution interpolation guidance (IG) signal 690. In the full color mode, the chroma (CbCr) signal 676 is processed by the LPF 602, the decimator 614, and the interpolation information generator 620 and the sub-band splitter 508 outputs a full resolution chroma difference image (HPCbCr) signal 695. In a luminance mode, the output of the sub-band splitter may include, among other signals, Y" 628 and HPY signal 658.

The low pass anti-aliasing filter 602 is a circuit that receives the luma signal 624 and/or the chroma signal 676 as input and generates a low-pass filtered luma signal (Y') 636 and/or a low-pass filtered chroma signal (Cb'Br') 684. The low-pass filtered luma signal 636 and the low-pass filtered chroma signal 676 are sent to the input of the decimator 614. In some configurations, the low pass filter 602 may include a vertical filter and a horizontal filter to perform filtering of luma signal 624 and/or chroma signal 676 along the vertical and horizontal directions, respectively.

The decimator circuit 614 discards a portion of the pixels of each block of pixels in the low-pass filtered luma signal 636 and/or the low-pass filtered chroma signal 684 and generates the decimated luma signal (Y") 628 and/or the decimated chroma signal (Cb"Cb") 678. In some configurations, the decimator circuit 614 performs a 2:1 decimation which implies discarding all but the top left pixel of each 2×2 block of pixels.

In some embodiments, the decimator circuits 614 may receive a control signal from the sub-band splitter 508 that determines whether to allow or bypass the signal received at the input of the decimator circuit 614.

The interpolation information generator 620 is a circuit that generates interpolation guidance information 690 that enables performing an adaptive interpolation process to interpolate the decimated image signal data into a full-resolution image signal data. The interpolation information generator 620 may include one or more comparators that analyze the difference between the pixel values of two pixels. The interpolation information generator 620 may also include a circuit that generate a multi-bit vector and store the generated multi-bit vector in a separate memory component. The interpolation information generator 620 of FIG. 6 is only one embodiment of the present disclosure, and several other embodiments are possible in various combinations of hardware, firmware or software.

The interpolation information generator 620 of sub-band splitter 508 receives the input from decimator circuit 614. The input to the interpolation information generator 620 may include undecimated signals (i.e., luma signal (Y) 621 and/or chroma signals (CbCr) 676), the decimated signals signal (i.e., luma signal (Y") 628 and/or chroma (Cb"Cr") signal 678). The interpolation information generator 620 generates, among several other operations, an interpolation guidance information based on the signals received at the input. The interpolation information generator 620 performs an adaptive interpolation process, as described below in detail with reference to FIGS. 7 through 11. The output of the interpolation information generator 620 may include at least a full-resolution luminance difference image (HPY) signal 685, a full-resolution interpolation guidance (IG) signal 690 as well as a full-resolution chroma difference image (HPCbCr) signal 695 in the full color mode.

The sub-band splitter 508 generates the full-resolution luminance difference image (HPY) signal 685 and the full-resolution chroma difference image (HPCbCr) signal 695 representing a difference between a modified form of the undecimated image data 424 received at the input of the sub-band splitter 508, and a modified form of an image signal data reconstructed from the decimated luma signal 628, and the decimated chroma signal 678 using the interpolation information generator 620.

The interpolation guidance signal 690 may include, among several other information, interpolation guidance information for each pixel in the undecimated full-resolution luma signal 648 and the undecimated full-resolution chroma signal 668. For each pixel, the interpolation guidance information may represent levels of of Euclidian distance between pixels in the undecimated image and one or more neighboring pixels of either the undecimated or decimated image.

In some embodiments, the interpolation guidance information in the interpolation guidance signal 690 may include an n-bit vector for each pixel in the undecimated full-resolution image shared between luminance signal 648, and chroma signal 668. Each element of the n-bit vector may indicate a level of similarity between luma and chroma values of a neighboring pixel in the undecimated image data based on Euclidean distance and those of each pixel in the decimated image data. For example, when there are four neighboring pixels for each pixel, the interpolation guidance information may constitute a eight-bit vector.

The Euclidean distance between two pixels can be calculated from the pixel values of the two pixels. Assuming that a first pixel has $(Y_1, Cb_1, Cr_1)$ pixel values (where $Y_1$ refers to the luma value of the first pixel, $Cb_1$ and $Cr_1$ refer to chroma values of the first pixel), and a second pixel has $(Y_2, Cb_2, Cr_2)$ pixel values (where $Y_2$ refers to the luma value of the second pixel, $Cb_2$ and $Cr_2$ refers to chroma values of the second pixel), the Euclidean distance between the two pixels can be computed as follows:

$$\sqrt{((Y_1-Y_2)^2+(Cb_1-Cb_2)^2+(Cr_1-Cr_2)^2}\qquad\text{Equation (1)}$$

Equation (1) is merely one example of computing the Euclidean distance. A simplified or modified form of Equation (1) may be used to compute the Euclidean distance. Moreover, non-Euclidean distance can be used for calculating the difference between pixel values.

FIG. 6 is only an exemplary embodiment of a sub-band splitter, and several other variations are possible, using a combination of hardware, software and firmware that are not explicitly shown here.

Generation of Interpolation Guidance Signals

The interpolation guidance signal 690 may include, among other components, a vector which, in some embodiments, may be an eight-bit vector. Pairs of bits of the vectors contain a signal representing the difference between the current pixel and one of its neighboring pixels. The process of generating the interpolation guidance signal 690 for the decimated image is hereinafter referred as the "adaptive interpolation." The value for pairs of bits of the vector may represent the level of similarity between a current pixel and its one or more neighboring pixels based on the Euclidean distance between the pixel and its neighboring pixels.

In one embodiment, the value for a pair of bits may be either "00," "01," "10," or "11." Each pair of bits describes a level of similarity between each pixel and one or its neighboring pixels. For example, the value of "00" for a pixel indicates that the pixel and one of its neighboring pixels has a first level of similarity. In one embodiment, the first level of similarity indicates that a distance between pixel values of the pixel and pixel values of the neighboring pixel is less than a first threshold. The value of "01" indicates that pixel and neighboring pixel has a second level of similarity. In one embodiment, the second level of similarity indicates that a distance between a pixel value of the pixel and a pixel value of the neighboring pixel is greater than the first threshold and less than a second threshold that is higher than the first threshold. The value of "10" indicates a third level of similarity between each pixel and one of its neighboring pixels. In one embodiment, the third level of similarity indicates that a distance between a pixel value of the pixel and a pixel value of the neighboring pixel is greater than the second threshold and less than a third threshold that is higher than the second threshold. The value of "11" indicates a fourth level of similarity between each pixel and one of its neighboring pixels. In one embodiment, the fourth level of similarity indicates that a distance between a pixel value of the pixel and a pixel value of the neighboring pixel is greater than the third threshold.

Thus, the first level indicates the closest level of similarity between a pixel value of a pixel and a pixel value of the neighboring pixel and the fourth level indicates the lowest level of similarity between the pixel value of the pixel and the pixel value of the neighboring pixel. The second level indicates the second closest level of similarity between a pixel value of a pixel and a pixel value of the neighboring pixel and the third level indicates the third closest level of similarity between a pixel value of a pixel and a pixel value of the neighboring pixel. Additional levels of similarities may be determined based on additional thresholds in other embodiments.

Figure 7:
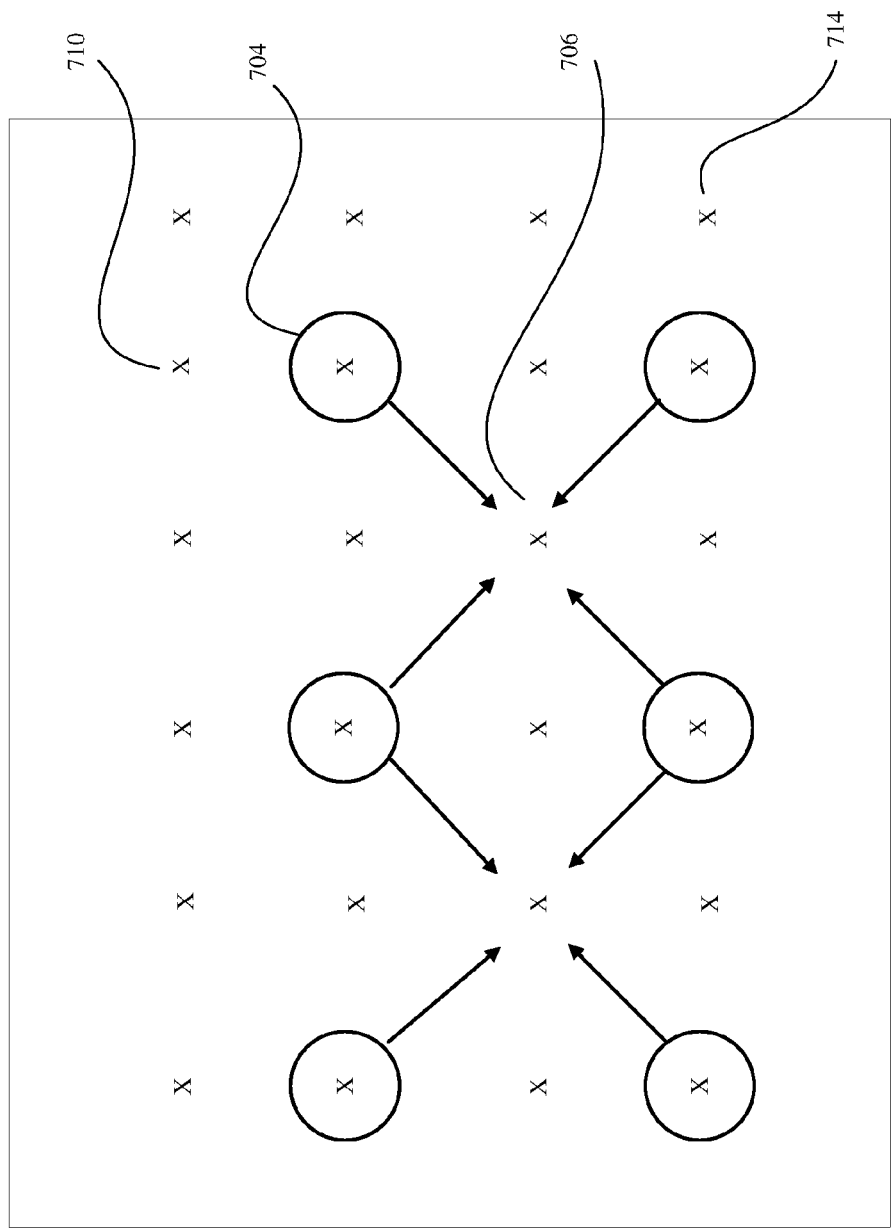
FIG. 7 is a diagram explaining notations associated with interpolating of decimated input signals, according to one embodiment.

FIG. 7 is a representative image for explaining generation of the interpolation guidance signals, according to one embodiment. The interpolation information generator 620 receives the decimated luma signal 628 (and optionally the decimated chroma signal 678 during the full color mode) (hereinafter collectively referred to as "the decimated image data") and performs an adaptive interpolation process to generate the interpolation guide signals for pixels as well as the full resolution luma detail (HPY) signal 685. The interpolation information generator 620 performs the adaptive interpolation process on the decimated chroma signal 678 during the full color mode to generate the full resolution chroma detail (HPCbCr) signal 695. The undecimated image data includes an array of pixels with each pixel 710 represented as 'x' having pixel values (e.g., luma and chroma values) while the decimated image data includes pixels indicated by 'x' enclosed in circles. The pixels indicated by 'x' enclosed in circles are also referred to as the interpolation nodes. The interpolation nodes described herein refer to locations of pixels that remain in the decimated image data after the decimation process. Decimated pixels from the interpolation nodes can be later used by the sub-band merger 536 in conjunction with the interpolation guide signal to reconstruct full resolution image data by interpolation. The interpolation guide signal for a center pixel pointed by the arrows indicates the level of similarity between the center pixel and its neighboring pixels.

The interpolation information generator 620 of FIG. 6 may compute a set of Euclidian distances between a pixel and its neighbors to decide on weights with which neighboring pixels should be used to reconstruct the interpolated pixel at the sub-band merger 536. In some configurations, the adaptive interpolation process generates four different Euclidian distances between a pixel and its neighboring pixels (e.g., diagonally located pixels at the interpolation nodes in FIG. 7). Accordingly, the interpolation guidance signal 690 may include a vector corresponding to the Euclidian distances from each of the neighboring pixels. In the illustrated embodiment, interpolation guidance signal may include an eight bit vector representing two-bits for each neighboring pixel.

Each pair of bits of the vector for a pixel quantifies similarity between a neighboring pixel and the current pixel as mentioned above. If the Euclidean distance between a pixel and its neighboring pixel indicates a high level of similarity (e.g., a first or second level of similarity) between the pixel and its neighboring pixel, the neighboring pixel is likely not separated from the pixel by an image feature (e.g., edge or border of an image). Hence, the neighboring pixel is used later with a higher weight to reconstruct the pixel through interpolation at the sub-band merger 536. Conversely, if the Euclidean distance indicates a lower level of similarity (e.g., a third or a fourth level of similarity) between the pixel and its neighboring pixel, the neighboring pixel and the pixel are likely separated by an image feature. Hence, the neighboring pixel is not used or given less weight when reconstructing the pixel by interpolation at the sub-band merger 536.

Figure 8:
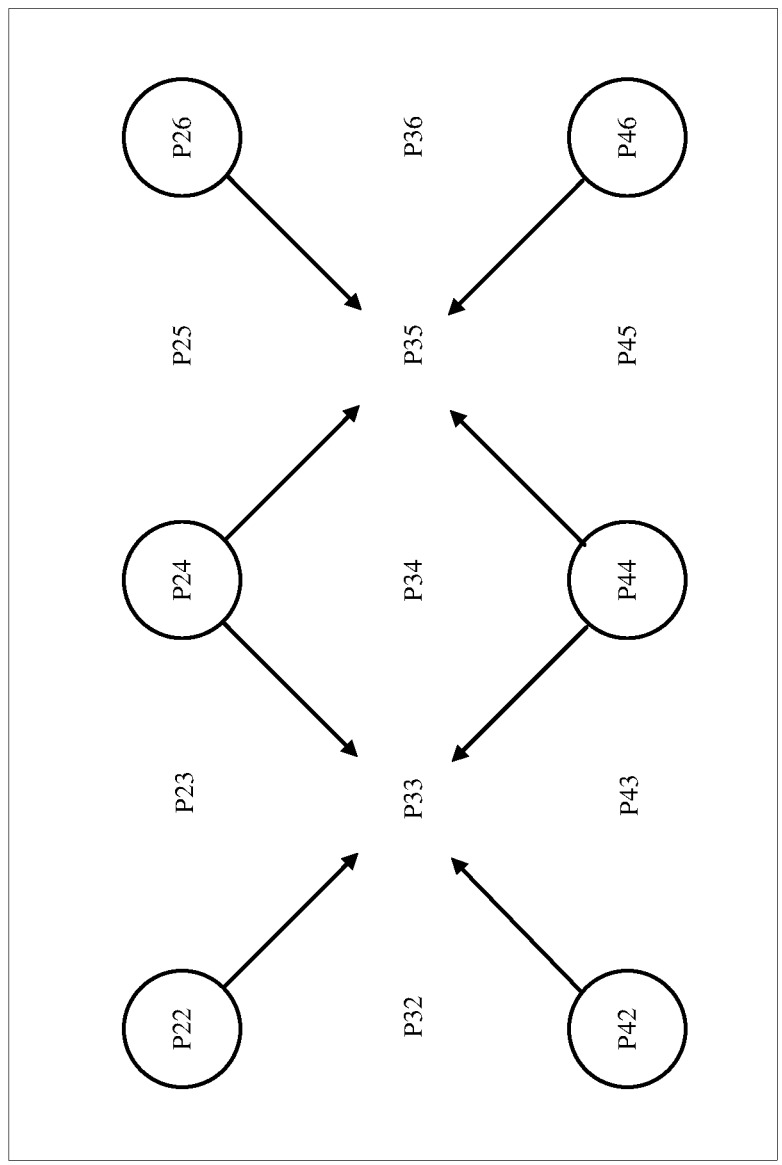
FIG. 8 is a diagram illustrating a first step of adaptive interpolation, according to one embodiment.

Adaptive interpolation may be performed in four steps. FIG. 8 is a representative image of the first step of adaptive interpolation, according to one embodiment. In this step, the interpolation information generator 620 determines the Euclidian distances between pixel values of pixels at interpolation nodes in the decimated image and pixel values of a first subset of pixels diagonally located adjacent from pixels in the undecimated full-resolution image. In the example shown in FIG. 8, the pixels in solid circles (e.g., P22, P24, P42 and P44) represent a first group of the decimated image pixels in the interpolation nodes. In the undecimated image data, pixel P33 (to be discarded in the decimated image data) is diagonally located from pixels corresponding to the first group of pixels. In the same example shown in FIG. 8, the pixels in solid circles shown as P24, P26, P44 and P46 represent a second group of the decimated image pixels in the interpolation nodes. In the undecimated image data, the pixel P35 is diagonally located from pixels in the first group.

The interpolation guidance signal 690 then includes a vector indicating the levels of similarity between the current pixel in the undecimated image (e.g., P33) and its corresponding neighboring pixels (e.g., P22, P24, P44 and P42—all from the decimated image) based on the Euclidian distances and the predefined thresholds set in the interpretation generator 620. The value for pairs of bits of the second vector represent the level of similarity between the current pixel P35 and its corresponding neighboring pixels represented by P24, P26, P46 and P44 based on the predefined thresholds set in the interpolation information generator 620. The sequence of elements in the vector may be predefined (e.g., the first two vector elements associated with the similarity of an upper left neighboring pixel to the current pixel, the next two vectors element associated with the similarity of an upper right neighboring pixel in the current pixel, the next two vectors element associated with the similarity of a bottom right neighboring pixel in the current pixel, and the last two vectors element associated with the similarity of a bottom right neighboring pixel in the current pixel.).

Figure 9:
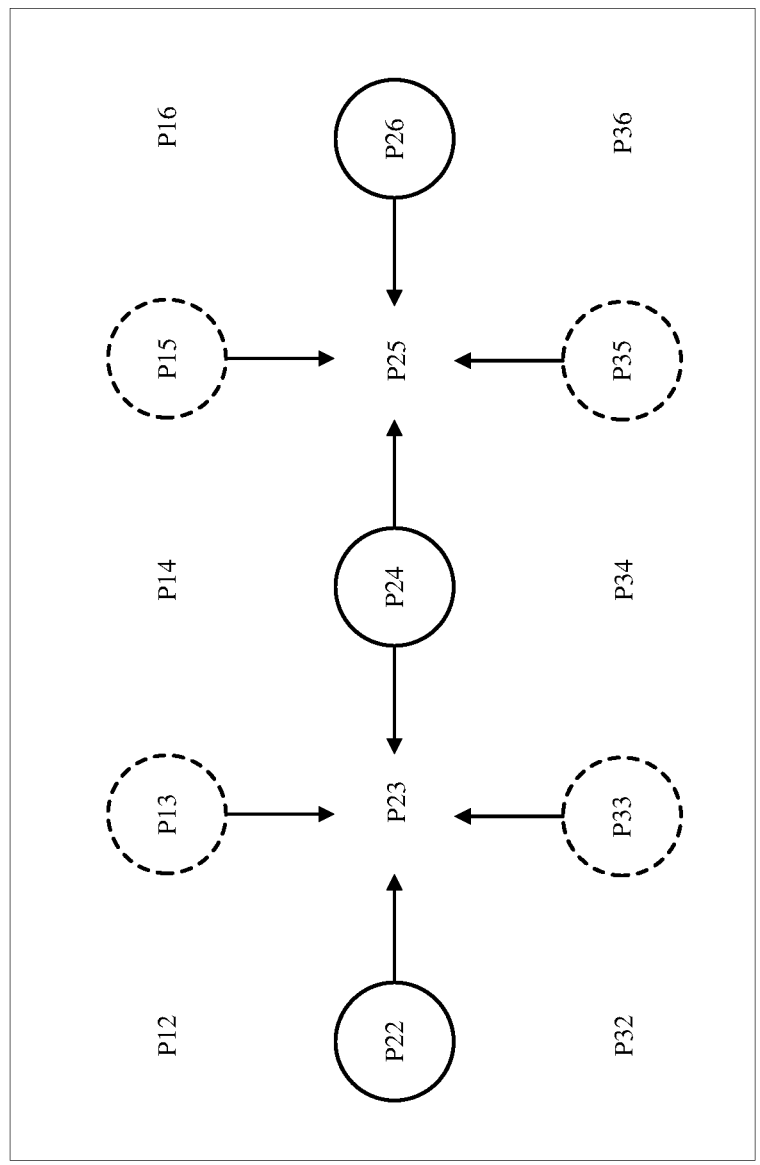
FIG. 9 is a diagram illustrating a second step of adaptive interpolation, according to one embodiment.

FIG. 9 is a representative image of second step of adaptive interpolation, according to one embodiment. In this step, the interpolation information generator 620 determines, for a pixel (e.g., P23 or P25), the Euclidian distances between the pixel values of the pixel and the pixel values of pixels at the interpolation nodes (e.g., P22 and P24 for P23, and, P24 and P26 for P25, from the decimated image) horizontally adjacent to the pixel (e.g., P23 or P25), and the Euclidian distances between the pixel (e.g., P23, P25) and vertically neighboring pixels (P13 and P33 for P23, and P15 and P35 for P25) in the undecimated image data. In one embodiment, the interpolation information generator 620 receives information from another component of the image processing pipeline (e.g., a noise reducer) indicating one or more sets of pixels as being related (e.g., pixels belonging to the same noise cloud). In such embodiment, the interpolation information generator 620 may use the information from the image processing pipeline to determine the level of similarity between the pixels.

The interpolation guidance signal 690 then generates a vector for the current pixel (e.g., P23 or P25) based on the determined Euclidian distances and the information from the other component of the image processing pipeline (e.g., a noise reducer) in the same manner as described above with reference to FIG. 8. In one embodiment, the information from the other component of the image processing pipeline (e.g., a noise reducer) may be prioritized over the Euclidian distance to decide the level of similarity between the pixels while pixels not identified as being related.

Figure 10:
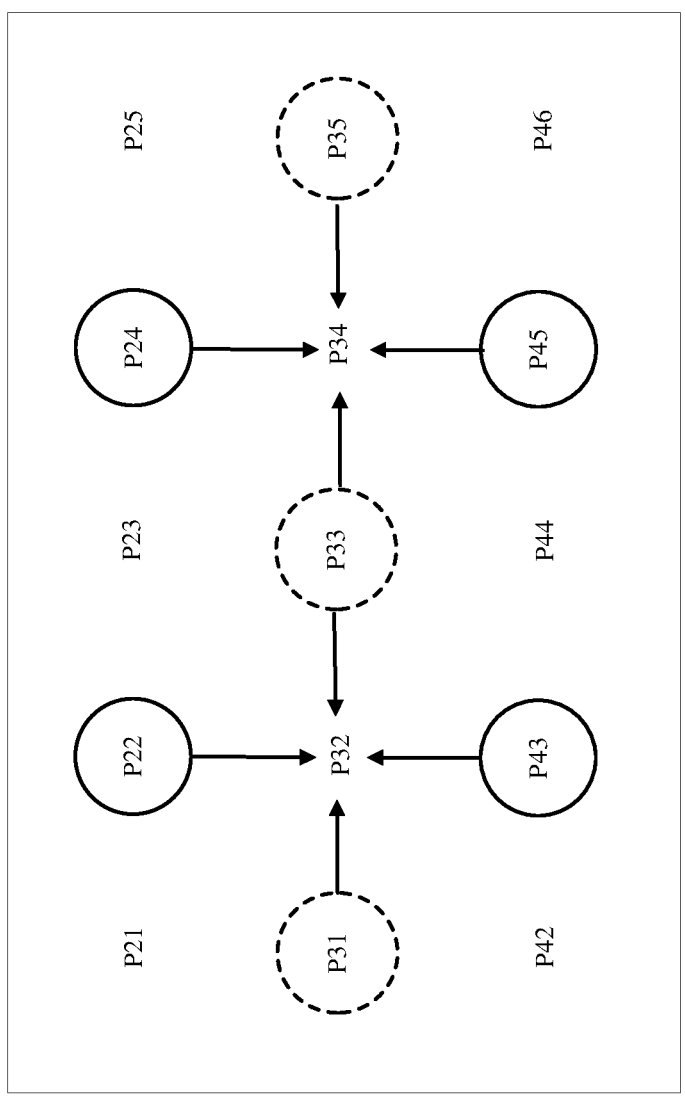
FIG. 10 is a diagram illustrating a third step of adaptive interpolation, according to one embodiment.

FIG. 10 is a representative image of third step of adaptive interpolation, according to one embodiment. In this step, the interpolation information generator 620 determines the Euclidian distances between the pixel values of a current pixel (e.g., P32 and P34) and its neighboring pixels (P22, P31, P33 and P43 for the current pixel P32; and P24, P35, P45 and P33 for the current pixel P34), and then generates a vector for the current pixel including elements to indicate the level of similarity between the current pixel and each of its neighbors based on the Euclidian distances between the pixel and its neighbors, as described in detail with reference to FIGS. 8 and 9. Pixels P22, P24, P43 and P45 come from the decimated image data while pixels P32, P33 and P35 come from the undecimated image data.

Figure 11:
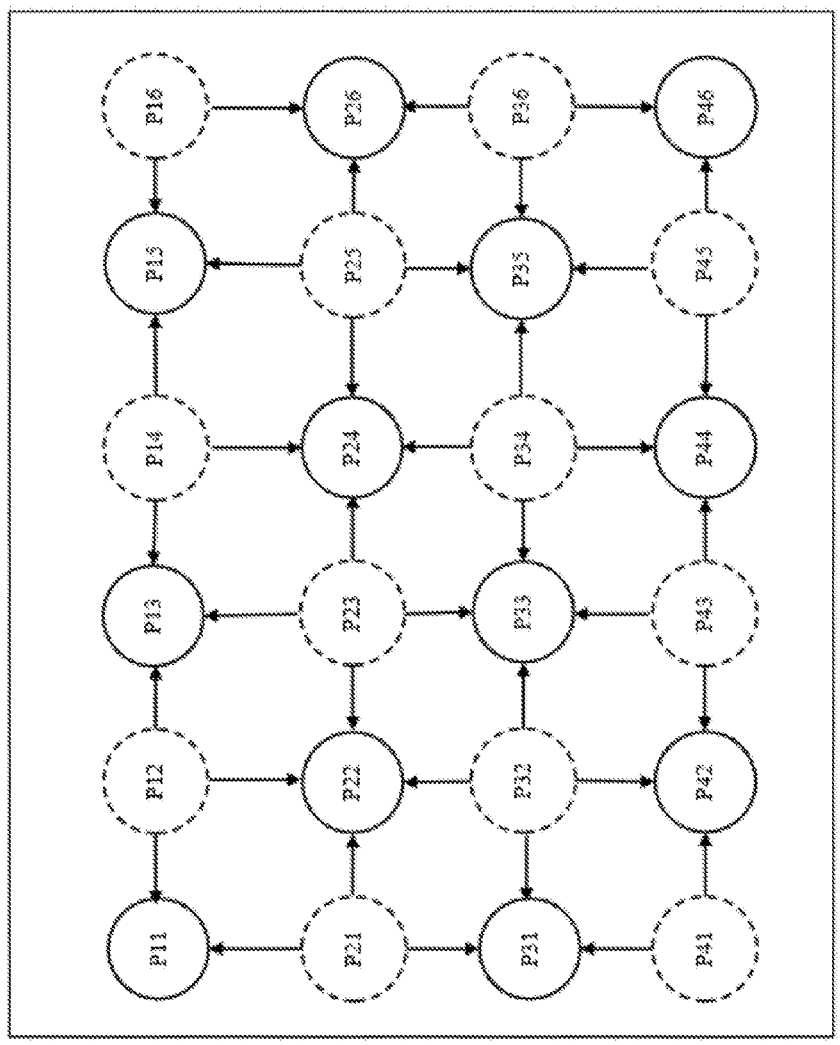
FIG. 11 is a diagram illustrating a fourth step of adaptive interpolation, according to one embodiment.

FIG. 11 is a representative image of fourth step of adaptive interpolation, according to one embodiment. In this step, the interpolation information generator 620 determines, for each interpolation node (e.g., P11, P13, P15, P22, P24, P26, P31, P33, P35, P42, P44 and P46), the Euclidian distances between the pixel values of the pixels at the interpolation nodes in the undecimated image data and its neighboring pixels in the undecimated image data. As a result, the interpolation information generator 620 generates a vector with eight elements indicating the level of similarity between a pixel and its neighboring pixels.

The adaptive interpolation scheme illustrated with reference to FIG. 7 through 11 is only an exemplary embodiment of the process described in the current disclosure, and several other variations are possible, using a combination of hardware, software and firmware that are not explicitly shown here. For example, the second step described above with reference to FIG. 9 and the third step described above with reference to FIG. 10 can be performed in a reverse order.

Example Sub-Band Merging Process

Figure 12:
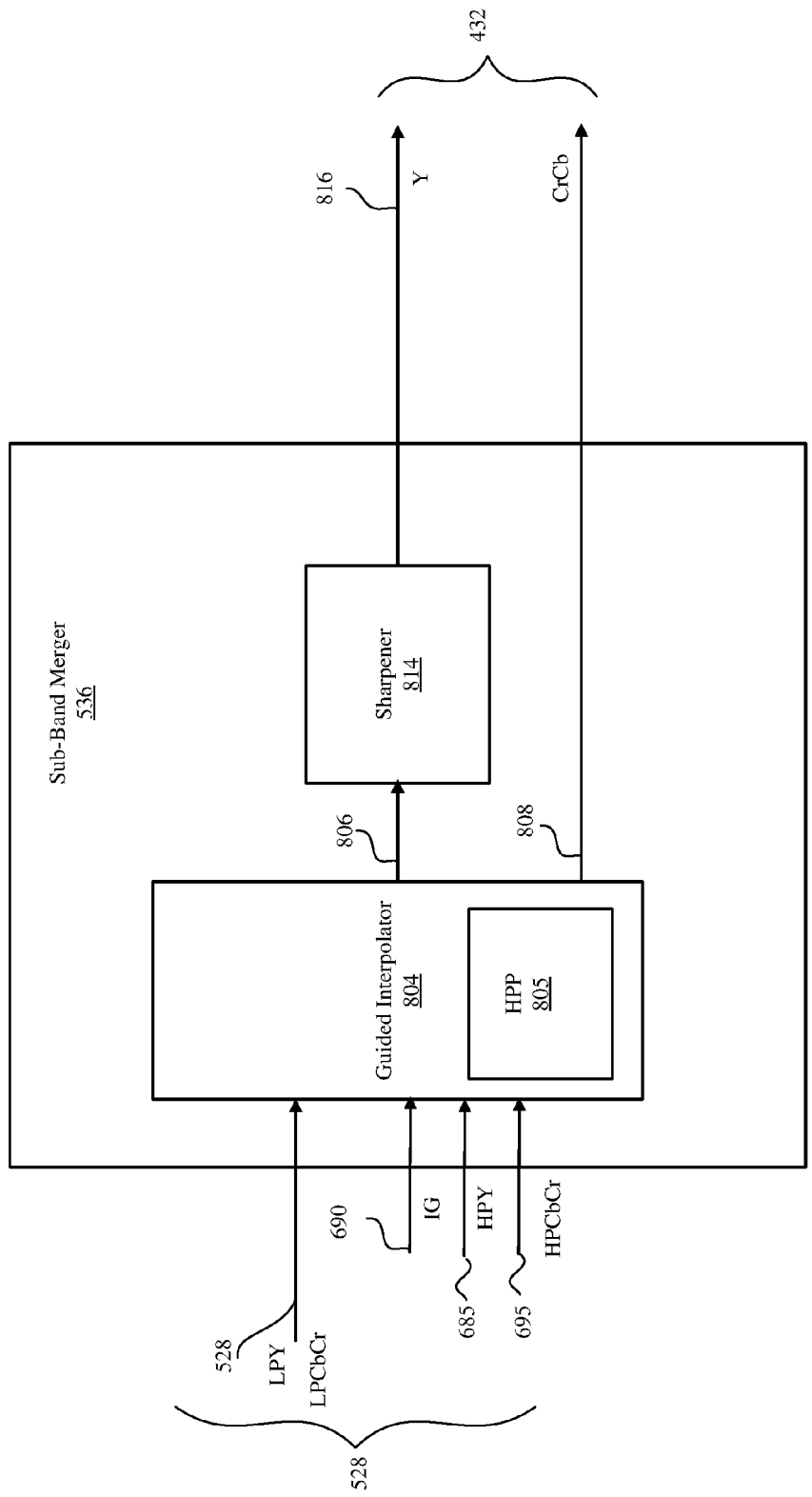
FIG. 12 is a block diagram illustrating a sub-band merger of FIG. 5A, according to one embodiment.

FIG. 12 is a representative image of components in the sub-band merger 536, according to one embodiment. The sub-band merger 536 may include at least a guided interpolator 804 and a sharpener 814. The sub-band merger 536 receives a full-resolution interpolation guidance (IG) signal 690, the processed decimated image signal data (LPY, LPCbCr) 528, a full-resolution luma difference image (HPY) signal 685, and a full-resolution chroma difference image (HPCbCr) signal 695. When not in full color mode (the HPCbCr signal is not received) the full resolution chrominance signal 808 can still be reconstructed assuming that HPCbCr signal is equal to 0. This would allow better chrominance signal interpolation than regular linear up-sampling, because interpolation assisted by the IG signal would stop color bleeding across strong image edges. The output image signal data 432 from the sub-band merger 536 may include at least a post-processed full-resolution luma signal 816 and/or a post-processed full-resolution chroma signal 808. The guided interpolator 804 may include a high-frequency post processor (HPP) 805 to perform local tone mapping operations.

The guided interpolator 804 performs a four-step interpolation process based on the interpolation guidance signal 690 generated by the interpolation information generator 620. The guided interpolator 804 receives the processed decimated image signal data 528, a full-resolution luma difference image (HPY) signal 685, a full-resolution interpolation guidance (IG) signal 690, and a full-resolution chroma difference image (HPCbCr) signal 695. Using the interpolation guidance signal 690, the guided interpolator 804 reconstructs the undecimated image data from the processed decimated image signal data 528.

Specifically, the guided interpolator 804 reconstructs undecimated image data by following the sequence as illustrated above in detail FIG. 8 through 11. First, using the pixel values of pixels at the interpolation nodes (e.g., P22, P24, P42 and P44) and the interpolation guide signal for a decimated pixel (e.g., P33), the guided interpolator 804 interpolates the pixel values of all or a subset of the interpolation nodes to reconstruct the pixel values of the decimated pixel. Such operation is reverse to the operation as described above with reference to FIG. 8 with the only difference that pixels in the original undecimated image (unavailable to the sub-band merger 536) is replaced by the reconstructed full resolution image pixels.

During reconstruction of the pixel values, the HPP (High Frequency Post-Processor) 805 may adjust luminance values in the HYP signal 685 for the pixel being reconstructed at each interpolation step to account for local tone mapping and other operations which may have been performed on LPY and LPCbCr signals 528. In one embodiment, the HPP 805 adjusts the luminance values in the HYP signal 685 by weighting the pixel values of pixels from the HPY signal 685 with parameter values stored in a set of look-up tables that are derived from a local tone mapping of the undecimated image data to generate the modified version of the full-resolution luma difference image (HPY) signal 685. The HPP 805 weights the luminance values in the HPY signal 685, for example, by multiplying HPY value with the luminance-dependent coefficient the corrected HYP signal. The multiplicand value may differ based on the location of the pixel in the image.

In one embodiment, the reconstruction of a pixel value is performed based on neighboring pixels using the following equation:

$$Pint=\mathrm{sum}(Wi(IGi)*Pi)/\mathrm{sum}(Wi(IGi)) \qquad \text{Equation (2)}$$

where Pint represents a pixel value (i.e., a chrominance or luminance value) reconstructed by interpolation, i identifies neighboring pixels (e.g., i take values 0 through 3), Wi refers a weight assigned to each neighbor, IGi represents interpolation guide information for ith neighboring pixel, Pi represents a pixel value of the ith neighboring pixel. Equation (2) is merely an example and various other equations may be used to reconstruct pixels.

The guided interpolator 804 uses all or a subset of the pixel values of horizontally adjacent pixels (e.g., P22 and P24) and pixel values of pixels (e.g., P13 and P33) reconstructed in the first step as indicated by the interpolation guide signal for a decimated pixel (e.g., P23) to reconstruct the pixel values of the decimated pixel (e.g., P23). Such operation is reverse to the operation as described above with reference to FIG. 9.

The guided interpolator 804 performs operations reverse to what was described above with reference to FIGS. 10 and 11 to reconstruct the undecimated image data.

The guided interpolator 804 merges a modified version of the full-resolution luma difference image (HPY) signal 685 with the reconstructed version of the undecimated image data to obtain the reconstructed full-resolution luma signal 806. The guided interpolator 804 also merges the modified version of the full-resolution chroma difference image (HPCbCr) signal 695 with the reconstructed version of the undecimated image data to obtain the reconstructed full-resolution chroma signal 808 during the full color mode.

The sharpener 814 in the sub-band merger 536 may include a 3×3 low-pass filter and a detail mapping block. The reconstructed full-resolution luma signal 806 from the guided interpolator 804 passes through the 3×3 low pass filter to generate a low-passed luma signal. The difference between the low-passed luma signal and the reconstructed full-resolution luma signal 806 passes through a detail mapping block for sharpening, and added back to the low-passed luma signal to generate the post-processed full-resolution luma signal 816. The reconstructed chroma signal 808 from the guided interpolator 804 may not undergo the sharpening process.

Figure 13:
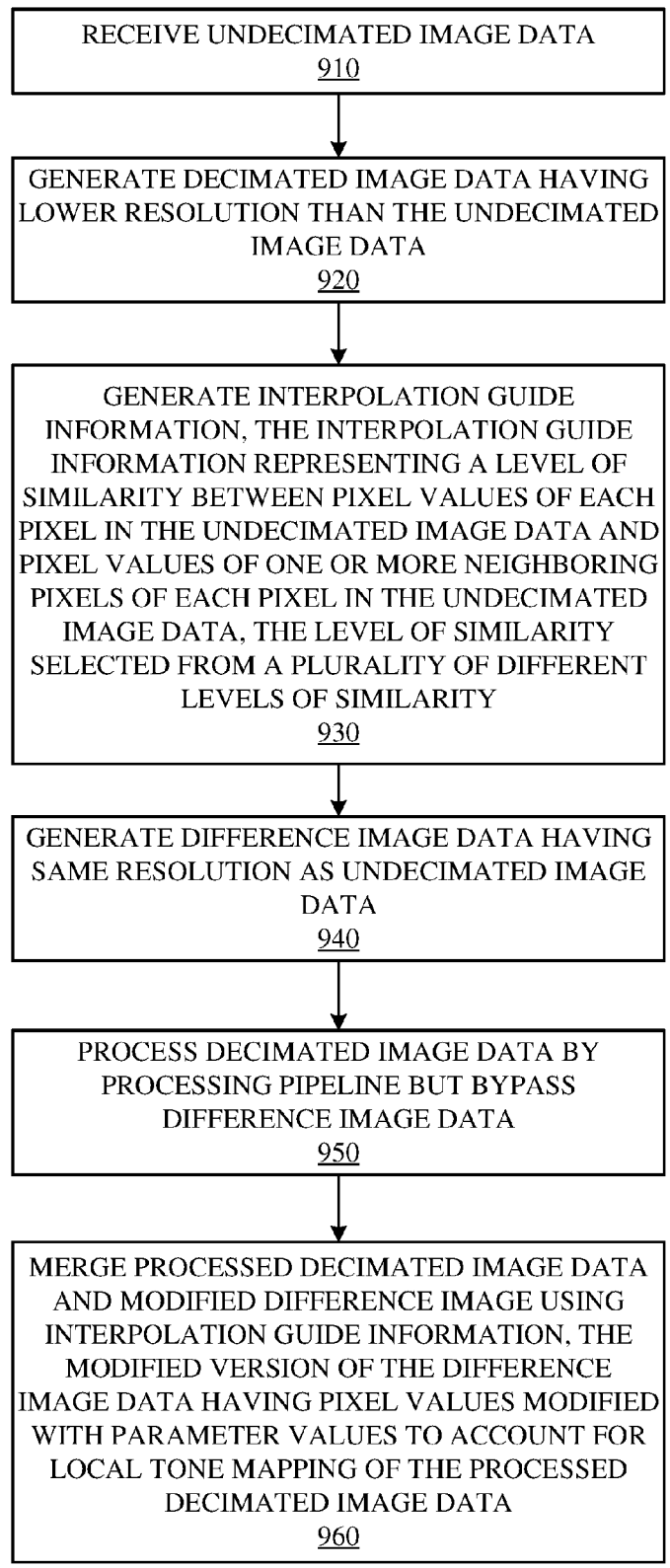
FIG. 13 is a flowchart illustrating a method of processing images by sub-band splitting and merging using an adaptive interpolation scheme, according to one embodiment.

FIG. 13 is a flowchart illustrating a method of sub-band splitting and merging using the adaptive interpolation process, according to one embodiment. The sub-band splitter 508, as described with reference to FIG. 6, receives 910 undecimated image data. The sub-band splitter 508 generates 920 a decimated image data having lower resolution than the undecimated image data. The sub-band splitter 508 generates 930 interpolation guidance information based on the undecimated image data and decimated image data. The interpolation guidance information may include a vector with each pair of bits representing a level of similarity between the current pixel and its one or more neighboring pixels. The level of similarity is selected from a plurality of different levels of similarity based on the distance between the current pixel and its neighbor and preset thresholds stored in the sub-band splitter 508.

The sub-band splitter 508 generates 940 the difference image data having the same resolution as the undecimated image data. The sub-band processing pipeline 526 processes 950 the decimated image data without processing the difference image data. The sub-band processing pipeline 526 consumes computational resources as it bypasses the difference image data.

The sub-band merger 536 merges 960 the processed decimated image data with a modified version of the difference image data using the interpolation guidance information to generate a processed image data with full-resolution. The difference image data is modified with parameter values that account for local tone mapping of the decimated image data. The interpolation guidance information enables the interpolation of the decimated image data having a lower resolution to generate a processed image data with full-resolution. The process allows bypassing the undecimated image data from the sub-band processing pipeline resulting in at least a lower consumption of computational resources.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein.

What is claimed is:

1. An apparatus for processing image signal data, comprising:
  a sub-band splitter comprising:
   a decimator circuit configured to receive undecimated image data of a first pixel resolution, and generate decimated image data from the undecimated image data, the decimated image data having a second pixel resolution that is lower than the first pixel resolution, and
   an interpolation information generator coupled to the decimator circuit to receive the decimated image data, and configured to:
    generate interpolation guide information for each pixel in the undecimated image data, the interpolation guide information representing a level of similarity between pixel values of each pixel in the undecimated image data and pixel values of one or more neighboring pixels of each pixel in the undecimated image data, the level of similarity selected from a plurality of different levels of similarity, each of the plurality of different levels of similarity describing a different degree of similarity between each pixel in the undecimated image data and the pixel values of one or more neighboring pixels of the pixel in the undecimated image data, and
    generate difference image data representing a difference between the undecimated image data and a version of image reconstructed from the decimated image data and the interpolation guide information;
  a processing pipeline coupled to the sub-band splitter and configured to process the decimated image data by a processing pipeline without processing the difference image data; and a sub-band merger configured to merge the processed decimated image data with a modified version of the difference image data that bypassed the processing pipeline based on the interpolation guide information to generate a processed image data of the first pixel resolution, the modified version of the difference image data having pixel values modified with parameter values to account for local tone mapping of the processed decimated image data.

2. The apparatus of claim 1, wherein the sub-band splitter is configured to calculating the level of similarity by:
determining distances between pixel values of pixels at interpolation nodes in the decimated image data and pixel values of pixels corresponding to the interpolation nodes in the undecimated image data.

3. The apparatus of claim 2, wherein the plurality of different levels of similarity includes a first level for a relationship between each pixel in the undecimated image and a neighboring pixel of each pixel in the undecimated image indicating that a distance between a pixel value of the pixel and a pixel value of the neighboring pixel is less than a first threshold, a second level indicating that the distance is greater than the first threshold and less than a second threshold higher than the first threshold, a third level indicating that the distance is greater than the second threshold and less than a third threshold higher than the second threshold, and a fourth level indicating that the distance is greater than the third threshold.

4. The apparatus of claim 1, wherein the sub-band merger is further configured to generate the modified version of the difference image data for each pixel by weighting a pixel value for the pixel by a parameter value derived from a local tone mapping of the processed image data for the pixel.

5. The apparatus of claim 1, wherein the interpolation guide information comprises a vector for each pixel, each pair of elements of the vector indicating the level of similarity between a pixel value of the pixel in the undecimated image data and a pixel value of one of the neighboring pixels of the pixel in the undecimated image data.

6. The apparatus of claim 1, wherein the pixel values comprise luma and chroma of each pixel.

7. The apparatus of claim 1, further comprising a pre-processor coupled to the sub-band splitter, the pre-processor comprising at least one of a scaler to perform scaling on the undecimated image data or a noise reducer configured to reduce noise in the undecimated image data.

8. An electronic device comprising:
an image sensor; and
an image signal processor coupled to the image sensor and configured to receive image from the image sensor, the image signal processor comprising:
  a sub-band splitter comprising:
    a decimator circuit configured to receive undecimated image data of a first pixel resolution, and generate decimated image data from the undecimated image data, the decimated image data having a second pixel resolution that is lower than the first pixel resolution, and
    an interpolation information generator coupled to the decimator circuit to receive the decimated image data, and configured to:
      generate interpolation guide information for each pixel in the undecimated image data, the interpolation guide information representing a level of similarity between pixel values of each pixel in the undecimated image data and pixel values of one or more neighboring pixels of each pixel in the undecimated image data, the level of similarity selected from a plurality of different levels of similarity, each of the plurality of different levels of similarity describing a different degree of similarity between each pixel in the undecimated image data and the pixel values of one or more neighboring pixels of the pixel in the undecimated image data, and
      generate difference image data representing a difference between the undecimated image data and a version of image reconstructed from the decimated image data and the interpolation guide information;
  a processing pipeline coupled to the sub-band splitter and configured to process the decimated image data by a processing pipeline without processing the difference image data; and
  a sub-band merger configured to merge the processed decimated image data with a modified version of the difference image data that bypassed the processing pipeline based on the interpolation guide information to generate a processed image data of the first pixel resolution, the modified version of the difference image data having pixel values modified with parameter values to account for local tone mapping of the processed decimated image data.

9. The electronic device of claim 8, wherein the sub-band splitter is configured to calculating the level of similarity by:
determining distances between pixel values of pixels at interpolation nodes in the decimated image data and pixel values of pixels corresponding to the interpolation nodes in the undecimated image data.

10. The electronic device of claim 9, wherein the plurality of different levels of similarity includes a first level for a relationship between each pixel in the undecimated image and a neighboring pixel of each pixel in the undecimated image indicating that a distance between a pixel value of the pixel and a pixel value of the neighboring pixel is less than a first threshold, a second level indicating that the distance is greater than the first threshold and less than a second threshold higher than the first threshold, a third level indicating that the distance is greater than the second threshold and less than a third threshold higher than the second threshold, and a fourth level indicating that the distance is greater than the third threshold.

11. The electronic device of claim 8, wherein the sub-band merger is further configured to generate the modified version of the difference image data for each pixel by weighting a pixel value for the pixel by a parameter value derived from a local tone mapping of the processed image data for the pixel.

12. The electronic device of claim 8, wherein the interpolation guide information comprises a vector for each pixel, each pair of elements of the vector indicating the level of similarity between a pixel value of the pixel in the undecimated image data and a pixel value of one of the neighboring pixels of the pixel in the undecimated image data.

13. The electronic device of claim 8, wherein the pixel values comprise luma and chroma of each pixel.

14. The electronic device of claim 8, further comprising a pre-processor coupled to the sub-band splitter, the pre-processor comprising at least one of a scaler to perform scaling on the undecimated image data or a noise reducer configured to reduce noise in the undecimated image data.

15. A method for processing image signal data, comprising:

receiving undecimated image data of a first pixel resolution;

generating decimated image data from the undecimated image data, the decimated image data having a second pixel resolution that is lower than the first pixel resolution;

generating interpolation guide information for each pixel in the undecimated image data, the interpolation guide information representing a level of similarity between pixel values of each pixel in the undecimated image data and pixel values of one or more neighboring pixels of each pixel in the undecimated image data, the level of similarity selected from a plurality of different levels of similarity, each of the plurality of different levels of similarity describing a different degree of similarity between each pixel in the undecimated image data and the pixel values of one or more neighboring pixels of the pixel in the undecimated image data;

generating difference image data representing a difference between the undecimated image data and a version of image reconstructed from the decimated image data and the interpolation guide information;

processing the decimated image data without processing the difference image data; and merging the processed decimated image data with a modified version of the difference image data based on the interpolation guide information to generate a processed image data of the first pixel resolution, the modified version of the difference image data having pixel values modified with parameter values to account for local tone mapping of the processed decimated image data.

16. The method of claim 15, wherein calculating the level of similarity comprises:
determining distances between pixel values of pixels at interpolation nodes in the decimated image data and pixel values of pixels corresponding to the interpolation nodes in the undecimated image data.

17. The method of claim 16, wherein the plurality of different levels of similarity includes a first level for a relationship between each pixel in the undecimated image and a neighboring pixel of each pixel in the undecimated image indicating that a distance between a pixel value of the pixel and a pixel value of the neighboring pixel is less than a first threshold, a second level indicating that the distance is greater than the first threshold and less than a second threshold higher than the first threshold, a third level indicating that the distance is greater than the second threshold and less than a third threshold higher than the second threshold, and a fourth level indicating that the distance is greater than the third threshold.

18. The method of claim 15, further comprising:
generating the modified version of the difference image data for each pixel by weighting a pixel value for the pixel by a parameter value derived from a local tone mapping of the processed image data for the pixel.

19. The method of claim 15, wherein the interpolation guide information comprises a vector for each pixel, each pair of elements of the vector indicating the level of similarity between a pixel value of the pixel in the undecimated image data and a pixel value of one of the neighboring pixels of the pixel in the undecimated image data.

20. The method of claim 15, wherein the pixel value comprises luma and chroma of each pixel.

* * * * *